INVENTOR
ERNST WEICHEL
BY
ATTORNEYS.

United States Patent Office 3,521,439
Patented July 21, 1970

---

3,521,439
APPARATUS FOR HARVESTING CEREAL GRAINS, LEAFY VEGETABLES, OR HOED VEGETABLES
Ernst Weichel, Bahnhofstrasse 1, Heiningen,
Kreis Goppingen, Germany
Filed June 23, 1966, Ser. No. 560,972
Claims priority, application Germany, June 23, 1965,
W 39,397
Int. Cl. A01d 89/00
U.S. Cl. 56—364     7 Claims

ABSTRACT OF THE DISCLOSURE

A unit for harvesting hoed, leafy and stalk crops includes a frame and a draw bar extending from the frame for towing of the unit along a path laterally adjacent and paralleled to the travel of a tractor with the harvesting unit extending rearwardly and laterally of the tractor. A crop carrier may be drawn by the tractor and the harvesting unit may be drawn by the crop carrier. The harvesting unit includes a guide scoop and associated power driven means for moving harvested material along the guide scoop and either into the crop carrier or onto the path of travel of the tractor behind the tractor. Various known harvesting devices may be interchangeably mounted to extend along the forward edge of the scoop and substantially perpendicular to the path of travel.

BACKGROUND OF THE INVENTION

This invention relates to the harvesting of crops and, more particularly, to a novel and improved method of and apparatus for harvesting cereal grains, leafy vegetables, or hoed vegetables in a highly efficient manner.

There are known self-loading crop carriers which are highly suitable for picking, pressing, distributing, conveying and unloading crops, such as cereal grains or leafy vegetables, for transport. With the better designed self-loading crop transports, it is possible to load the crops selectively without any packing pressure or to load the crops under a fixed or adjustable packing pressure.

A disadvantage of known self-loading crop carriers and their method of operation resides in the fact that, as a rule, they are drawn directly behind a tractor in such a manner that the wheel tracks of the crop carriers correspond with the wheel tracks of the tractors. Consequently, the material to be picked up must be deposited, generally prior to loading, in the form of swaths which will lie between the wheels of the tractor. While it is true that one swath can be mown with a mowing unit extending laterally from the tractor and, during mowing of this one swath, a previously mown swath is simultaneously traversed by the tractor, this has the disadvantage that, prior to the loading of the first swath in a crop carrier, a tractor has to make a run in which a swath is mown but no swath is loaded. Also, before completion of the harvesting of the field, another run must be made in which only loading takes place and no mowing. This leads to a large number of wheel trails in the field, and this is a great disadvantage, particularly in bad weather or on moist or damp soil, to the extent that it is not feasible to use a labor-saving, self-loading crop carrier.

Various expedients have been proposed to avoid these disadvantages, but they have generally been subject to other and sometimes greater disadvantages. For example, it has been proposed to use a mowing unit in front of the tractor, but this entails the disadvantage that, for towing the mowing unit, its connection must be transferred from the front of the tractor to the rear of the tractor, in addition to which there are operating disadvantages. It has also been proposed to design a self-loading crop carrier as an automatically driven vehicle, but this has entailed an unduly great expense.

A further proposal has been to connect the self-loading crop carrier laterally with the tractor so that it can pick up a freshly mown crop while the tractor is mowing a new swath, or else can pick up a swath mown by a mowing unit extending laterally from the tractor and immediately after the mowing. However, this has the disadvantage that the lateral traction of the crop carrier, including its own weight and its useful load, are double and triple the load of the tractor itself, which requires a more expensive design of tractor and a greater degree of driving skill. In addition, there is an increased accident risk when such an arrangement is used over unfavorable terrain, coupled with the further disadvantage that the crop must be deposited, at least temporarily, on the ground before it can be picked up by the self-loading crop carrier.

Harvesting and conveying devices for agricultural purposes are already shown in U.S. Pats. No. 2,593,617 and 2,494,388, and in German Pat. No. 652,455. In these arrangements, a harvesting implement, such as a cutter bar, for example, runs laterally beside the track of the tractor, and this is followed by a conveyor operating essentially at right angles to the direction of travel of the harvesting unit and which deposits the material, cut by the cutter bar, in narrow swaths, for example, into the path travelled by the cutter. In these known arrangements it is possible, in the next operation, to drive the tractor over a cleared strip of field, while the actual harvesting device becomes operative next to the track to be cleared.

The essential features of these known devices is that the material transported laterally by the conveying device is not deposited in a strip of a width corresponding to the path of movement of the tractor, but is rather deposited in a relatively narrow swath. Another feature is that the stalks of grain are collected in an upright position so that it becomes possible, for example, to pick up the swaths with a loading cart or the like. U.S. Pat. 2,494,388 shows, on the other hand, a cross conveying device which is designed to deposit the harvested goods onto a harvesting cart drawn by the tractor, so that this harvested material is not only conveyed horizontally and transversely but is also lifted vertically so as to be discharged over the side edges of the harvesting cart. In all known cases, it is not possible, with ensilage, for example, to spread out the latter after it has been mown and over a path width sufficient for drying the harvested material. The same problem is present, for example, in the case of potato vines which should be distributed over as wide an area as possible so as to accelerate the drying process.

Other disadvantages of known self-loading crop carriers reside in limitations as to the type of crop with which they may be used, as well as the disadvantage that they are not suitable for swathing, turning, or lateral pickup of the crop.

From the foregoing, it will be readily appreciated that there is a long felt need for a harvesting method and apparatus of greater versatility with respect to the type of crop which may be harvested and which would be more or less universally adaptable to all types of crops, thereby obviating the necessity of purchasing an expensive and poorly utilized special machinery. Such a unit, in addition, should be usable with known, commercially available self-loading crop carriers.

Accordingly, an object of the invention is to provide a harvesting device arranged for either lateral or frontal attachment to known self-loading crop carriers and which can be quickly attached and detached.

A further object of the invention is to provide a harvesting device which is operable on the crop either beside a tractor or in front of a crop carrier drawn by the tractor and which harvests the crop either by mowing, cutting, rooting out, or picking up.

Yet another object of the invention is to provide such a harvesting device which delivers the harvested crop to guide means extending adjacent mowing, cutting, gripping, or derooting units and which terminates behind the tractor or within the area of operation of gripping and conveying devices of a crop carrier drawn by the tractor.

A further object of the invention is to provide a harvesting device of the type just mentioned in which the crop is conveyed by conveying elements along a path extending obliquely rearwardly relative to the area of the receiving means of the crop carrier at the end of the guide means.

Yet another object of the invention is to provide a harvesting device of the type mentioned which is so formed that it may be quickly and easily attached and detached from a swingable arm adjustable to a fixed position and adjustable as to height above the ground, although positioned near the ground, thereby providing versatility as to the harvesting path.

Still another object of the invention is to provide an apparatus for harvesting crops, such as sugar beets, in which a row of sugar beet leaves and a row of sugar beets may be simultaneously harvested or alternately harvested.

A further object of the invention is to provide an apparatus for harvesting crops by means of which dug crops may be temporarily deposited on the ground for drying of soil attached thereto, or may alternatively be cleaned before depositing in a crop carrier drawn by a tractor.

Still a further object of the invention is to provide a harvesting apparatus of the type mentioned which is further useful for harvesting hay and fodder for storage, for example by loosening, turning, swathing or strewing.

A further object of the invention is to provide a harvesting apparatus for cereal grains, leafy vegetables or hoed vegetables which is simple in design, economical in construction and operation, and efficient in use.

For an understanding of the principles of the invention, reference is made to the following description of typical embodiments thereof as illustrated in the accompanying drawings.

Figure 1:
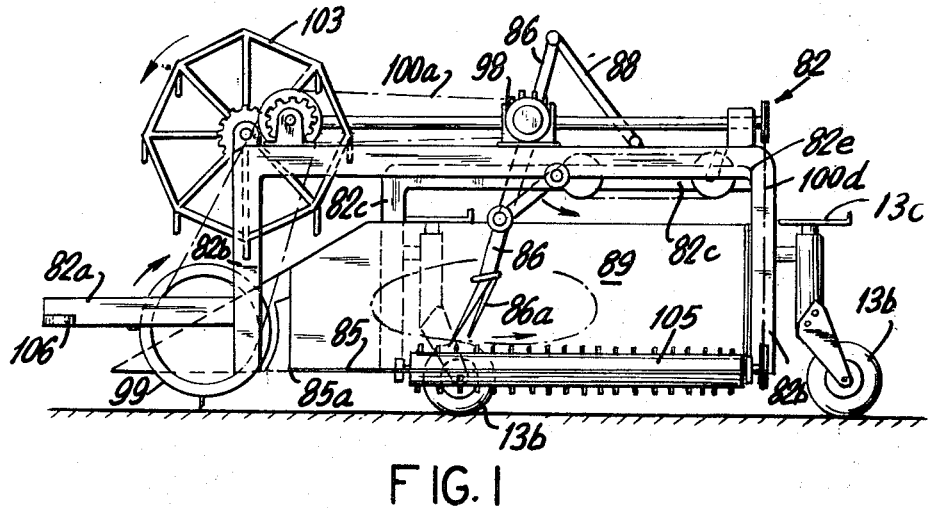
FIG. 1 is a side elevation view of one form of harvesting unit embodying the invention, as viewed from the left in the direction of travel.
Figure 2:
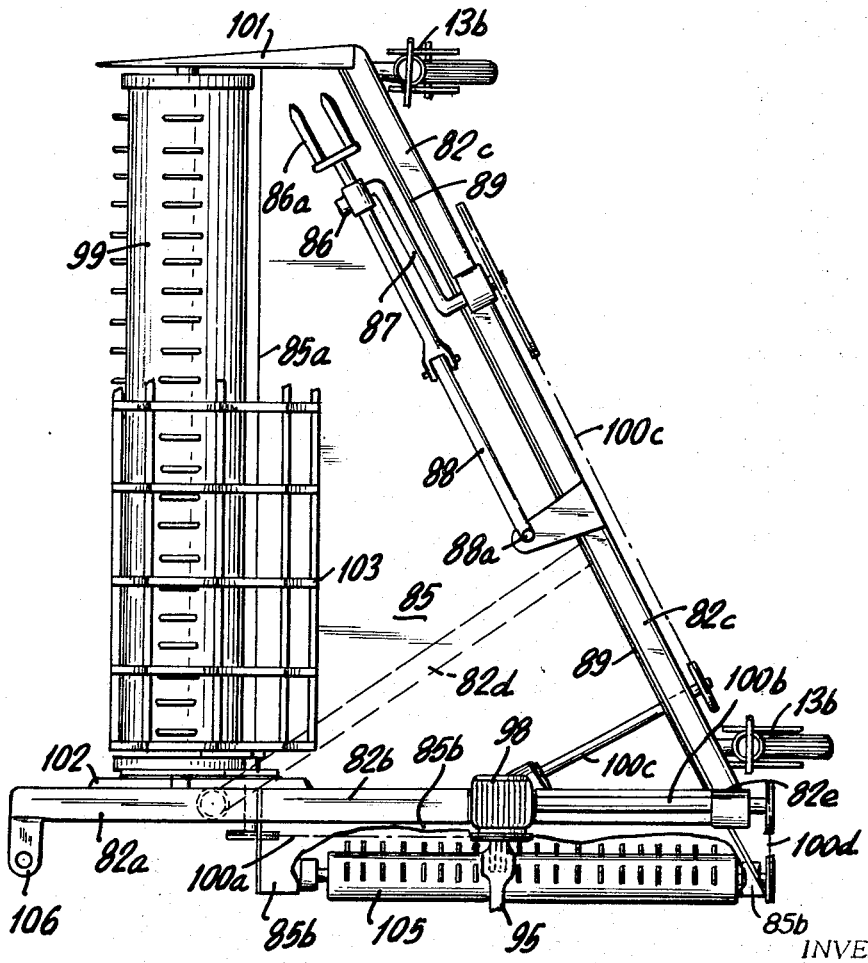
FIG. 2 is a plan view of the unit shown in FIG. 1.

Referring first to FIGS. 1 and 2, and as can be best seen from FIG. 2, a harvesting unit 82 embodying the invention is illustrated as comprising a tubular frame having a front part 82a designed as a rigid traction member or draw bar having a preferably laterally extending traction eye 106. Draw bar 82a extends forwardly from an inverted U-shaped frame 82b on which there is mounted a reduction gear unit 98 from which there extend power transmission means 100a, 110b, 100c and 100d. Unit 82 further includes a member 82c extending laterally and forwardly at preferably an acute angle to the member 82b and terminating in a forwardly extending triangular wedge-shaped terminal plate 101. A pair of support wheels 13b are provided, one mounted at each end of the frame member 82c, and means 13c, such as a jack or the like, are provided for adjusting the height of unit 82 relative to the support wheels 13b. Frame members 82b and 82c are interconnected at point 82e and by a guiding means or plate 85 and by a strut 82d extending beneath plate 85. Counterplate 101, in conjunction with frame member 82b, serves to mount various receiving devices for operational units. By way of example, these two elements may mount a conveying windlass 103, a receiving drum 99, a blade-type mowing beam, a clearing body and cutting devices. The frame member and the terminal plate may also be used to mount known cereal distribution devices and/or sliding skids adjustable relative to the surface of the ground. For the purpose of supporting these parts, the inner frame member 82b has mounted thereon plates 102 which, together with terminal plate 101, interchangeably receive the various work units.

The forward edge 85a of guide plate 85 is connected adjacent pickup drum 99, plate beam 84, or other working units in such a manner that it is at only a short distance above the ground, as is the entire guide plate or guide means 85, so that all types of crops can easily fall over forward edge 85a onto guide plate 85. The inner lateral edge 85b of guide plate 85 extends preferably substantially parallel to the direction of travel, and also extends at a level somewhat higher than that of the main portion of the guide means. An edge wall 89 extends along the back part of the guide plate 85, and is preferably arranged to extend a substantial distance upwardly by bending from the guide plate 85 and fastening to the frame parts 82c. This edge wall 89 prevents the crop from falling over the rear edge of the guide means.

Within guide plate 85 there are provided conveying elements 86 which are designed, in the embodiment of the invention shown in FIGS. 1 and 2, as grippers or forks 86a, connected to guide rods 88, articulated to frame member 82c in such a manner that these grippers operate in a somewhat elliptical or oval path as indicated by the dot and dash line in FIG. 1. These conveying elements convey the crop, entering guide means 85 over forward edge 85a, without the crop coming into contact with the ground and generally in the direction of rear wall 89 laterally towards edge 85b. The conveying is effected in such a manner that the lateral removal of the crop occurs along edge 89 so that access of the crop over the entire width of harvesting unit 82, with the crop entering over forward edge 85a, is not impeded.

In accordance with the invention, a transport or throwing roller 105 can be provided on unit 82 and, depending upon its angular velocity, conveys the crop from edge 85b by a thrust motion to a further guide means or tub. Alternatively, roller 105 can be arranged to spill the crop, for example during spreading of the crop, onto the ground. These units 105 are know per se.

Driving of the work units, such as a mowing beam, receiving drum 99, conveying windlass 103, and conveying elements 86 or cutting devices as well as other working units, is effected through the reduction gear 98 with the mentioned power transmission elements 100a, 100b and 100c, of a known type and in a known manner. Other known power transmission means, such as hydraulic or peumatic means, can also be used for transmitting the driving forces.

In further accordance with the invention, the forward portion 81a of arm 81 can be designed as an extensible construction to counterbalance different lengths or depths of other work units such as, for example, a cutting device, a clearing device, a receiving drum, or the like. Such extension can be of a telescopic nature so that all these work units can be arranged at any time at the right distance in front of the forward edge 85a of guide plate 85 and in such a manner that the harvested crop is delivered to guide plate 85 without any subsequent contact with the soil and directly from the stock. In the area of rear edge 89 of guide plate 85, the conveying elements 86 can be arranged in as large a number of units as necessary and in such a manner that they clear the bottom surface of guide plate 85. They transport the crop substantially parallel to rear edge 89 of guide plate 85 in a direction toward the crop carrier or toward the receiving device on the crop carrier.

However, the forks 86, illustrated in FIGS. 1 and 2, have the advantage of simple design and periodic motion, as well as being suitable for transferring large volumes of crops having long stalks, such as grain or corn, etc. In addition, inasmuch as these conveying elements 86 are arranged entirely above guide plate 85, it is possible to set guide plate 85 at a very low level or very near the ground. In accordance with the invention, guide plate 85 can be adjusted to the path of motion of the conveying means and thus be oriented in an upwardly sloping manner from the forward edge 85a to the lateral edge 85b.

The desired operating height is set by adjusting support wheels 13a or 13b, and gear 98 is connected to gear 39 through shaft 95, or may be connected to any other power source. The tractor is then driven across the field to be harvested, and the crop is picked up laterally of the tractor or cut from the plants without being run over by the tractor wheels. The crop falls onto guide plate 85 and there accumulates until it slides into the area of operation of conveying elements 86 which push or throw the crop along rear edge 89 laterally and rearwardly to the operating area of receiving drum 15 or prongs 42.

In place of the conventional mowing beam incorporated in unit 82, a mowing beam could be rigidly mounted on the tractor in front of or behind the rear wheels. In the latter case, through a guide grating or sheeting arranged adjacent the blade beam 84, it can be assured that the cut crop does not drop to the ground. A special advantage of the lateral work unit 82 is, however, that it is possible to harvest across a wide path and thus obtain a high hourly performance.

Figure 3:
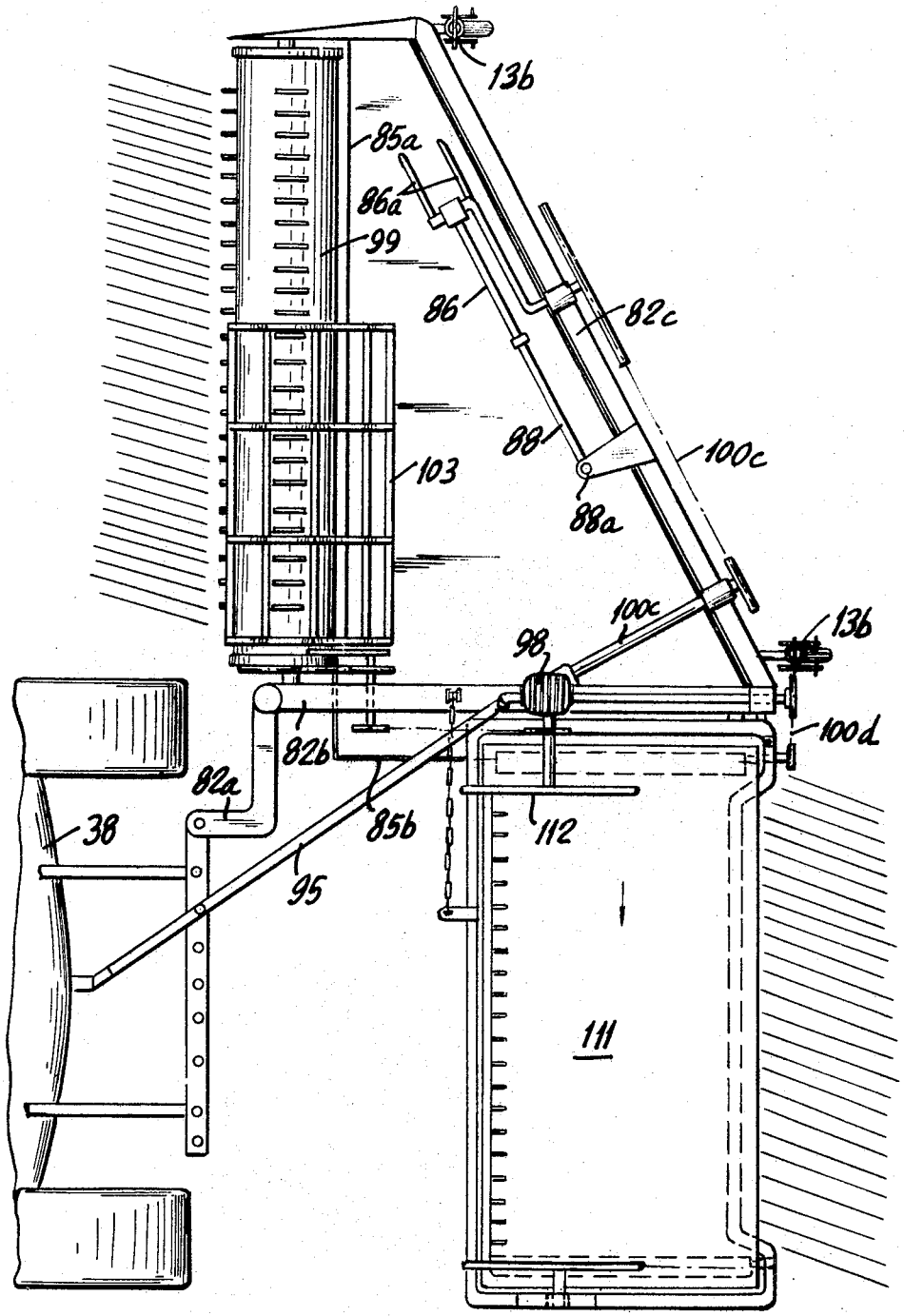
FIG. 3 is a plan view illustrating a harvesting device embodying the invention as attached to a tractor.

As illustrated in FIG. 3, the harvesting unit can be attached to tractor 38 without a crop carrier, and can be used for lateral transplanting, strewing, turning, swathing or loosening of crops such as, for example, grass, hay, straw and so forth, without it being necessary for the tractor wheels to run over the crop. Thus, and in a novel manner, the highest degree of careful treatment of the crop is possible without the slightest danger of the crop becoming dirty, as well as there being the highest operational speed. The crop is taken up by pickup drum 99 in a clean and careful manner from the ground, it is pushed along guide plate 85, and, during the swathing, it is deposited over edge 85b of guide plate 85. During the strewing, the crop is thrown out or ejected laterally because of the higher speed of operation of the conveying elements 86 or by the transport roller 105.

In accordance with the invention, conveyor belt 111, which may be of very light construction, can be arranged at the edge 85b of guide plate 85. The crop is delivered to this belt, and the belt deposits it periodically, by means of a light stripper 112 which is rotating, in a manner similar to the rotation of a windlass, at the side of the belt. The angular velocity of stripper 112 corresponds approximately to a conveying run of belt 111 over the length of the belt. Thus, a uniform deposition of the crop over the entire length of belt 111 and toward the rear edge thereof is effected.

What is claimed is:

1. In tractor-drawn apparatus for harvesting hoed, leafy and stalk crops, the improvement comprising, in combination, a harvesting unit including a frame and a draw bar extending from said frame for towing of said unit by a tractor along a path laterally adjacent and parallel to the path of travel of the tractor, with said harvesting unit extending rearwardly and laterally from the tractor; said frame including a first frame member extending parallel to the path of travel of said unit on the side of said frame adjacent to the path of travel of the tractor; said frame including a second frame member extending laterally and forwardly from the rear end of said first frame member; means providing a crop guiding surface including a bottom wall occupying at least the area defined by said frame members and having a forward crop pick-up edge extending transversely of the direction of travel of said unit, a rear upwardly extending wall extending longitudinally of said second frame member, and a crop discharge edge extending adjacent and parallel to said first frame member; crop conveying means mounted on said frame and having a conveying direction extending substantially parallel to the length of said second frame member and toward said first frame member, for transfer of harvested crop, entering said guiding surface over said forward edge, laterally and rearwardly of said guiding surface to the crop discharge edge of the latter; driving means mounted on said first-mentioned frame member; crop distributing means mounted on said frame and operative along the crop discharge edge of said guiding surface; and power transmission means connecting said crop distributing means to said driving means and operable to drive said crop distributing means at a speed such as to distribute the crop from said guiding surface laterally over substantially the full width of the path of travel of the tractor, for spreading of the harvested crop.

2. Apparatus for harvesting, as claimed in claim 1, including support wheels supporting said frame for travel parallel to the path of travel of said tractor; said support wheels being adjustable to adjust the height of said unit above the ground and being removably mounted on said unit.

3. Apparatus for harvesting, as claimed in claim 1, including a conveying roller constituting said distributing means rotatably mounted on and extending along said first-mentioned frame member; and drive transmission means interconnecting said driving means and said roller to drive the same at different speeds.

4. Apparatus for harvesting, as claimed in claim 3, in which the speed of said conveying means and the speed of said conveyong roller are variable and adjustable.

5. Apparatus, as claimed in claim 1, including additional crop conveying elements acting in the area of the leading edge of said guiding surface.

6. Apparatus for harvesting as claimed in claim 1, including means attaching said draw bar to a rear corner of said tractor; whereby said harvesting unit is operable to pick up, transfer laterally and rearwardly, and swath or strew crops without the tractor wheels running over the crops.

7. Apparatus for harvesting, as claimed in claim 1, in which said crop distributing means includes a conveyor belt extending laterally of said harvesting unit and receiving harvested crops therefrom; and a rotatable stripper operatively associated with said conveyor belt and making one complete revolution for each run of said conveyor belt equal to the entire length of said belt.

References Cited

UNITED STATES PATENTS

| 2,381,620 | 8/1945 | Russel | 56—364 X |
| 2,739,438 | 3/1956 | McClellan | 56—341 |
| 3,106,814 | 10/1963 | Roy | 56—341 |

FOREIGN PATENTS 652,455  11/1937  Germany.

LUCIE H. LAUDENSLAGER, Primary Examiner